United States Patent [19]

Adler

[11] 4,124,991
[45] Nov. 14, 1978

[54] OFFSHORE PIPE LAYING

[75] Inventor: Walter M. Adler, The Hague, Netherlands

[73] Assignee: Viking Jersey Equipment Ltd., St. Helier, Channel Islands

[21] Appl. No.: 806,287

[22] Filed: Jun. 13, 1977

[30] Foreign Application Priority Data

Jun. 14, 1976 [GB] United Kingdom ............... 24578/76

[51] Int. Cl.² .............................................. F16L 1/00
[52] U.S. Cl. .................................................... 405/166
[58] Field of Search ................. 61/107, 108, 109, 110, 61/111, 112; 226/196

[56] References Cited

U.S. PATENT DOCUMENTS 3,690,111 9/1972 Matthews, Jr. ...................... 61/108

Primary Examiner—Jacob Shapiro
Attorney, Agent, or Firm—LeBlanc & Shur

[57] ABSTRACT

A method of laying an offshore pipeline employs a pipe laying vessel with a fixed stern ramp and includes repeated steps of launching pipe while allowing pipe tension to drop between safe limits. Fresh pipe sections are welded on during the forward movements of the vessel.

4 Claims, 1 Drawing Figure

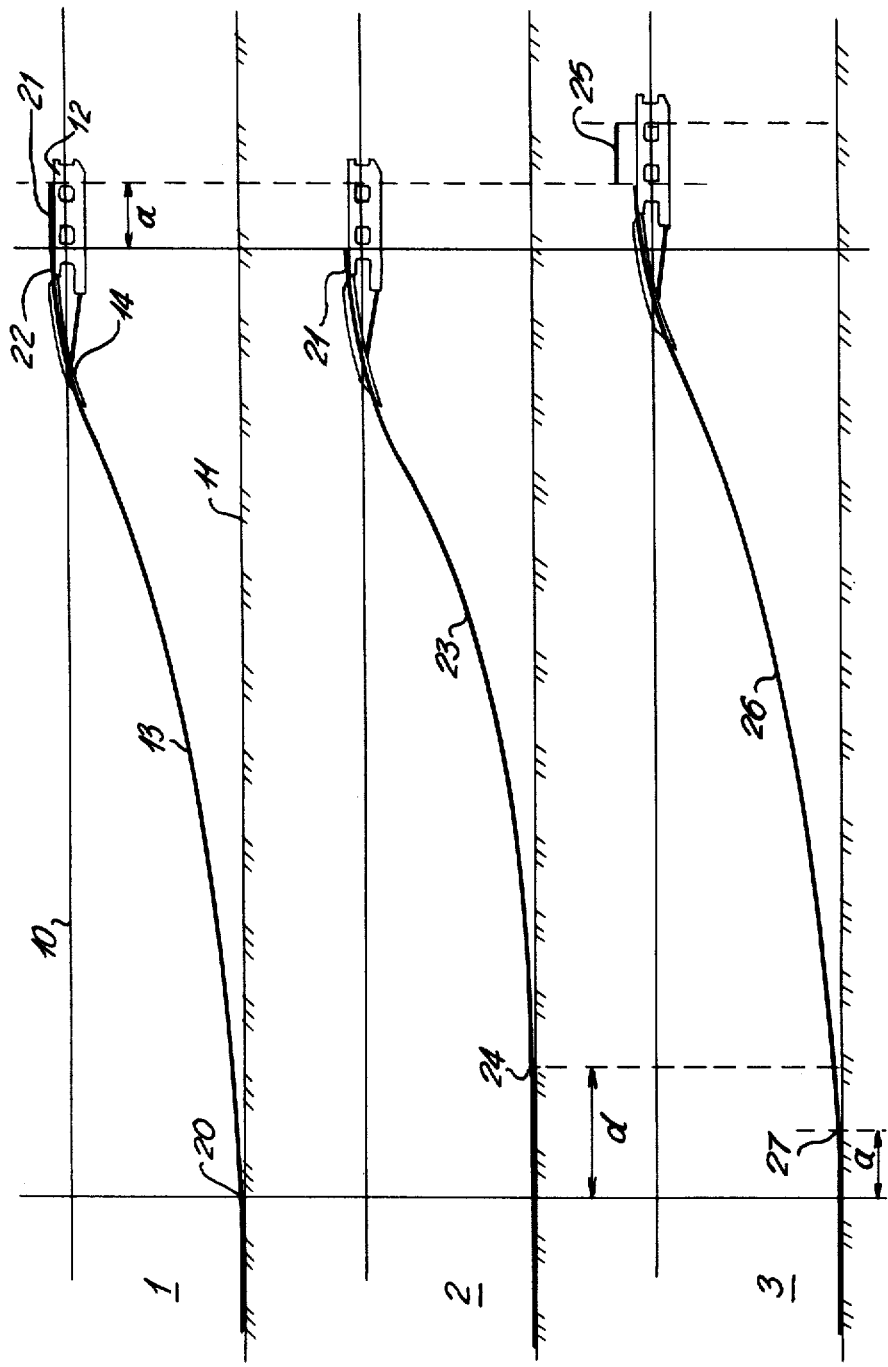

OFFSHORE PIPE LAYING

BACKGROUND OF THE INVENTION

The present invention relates to offshore pipe laying.

Hitherto, offshore pipe-lines have normally been laid on the sea bed using a pipe laying vessel or barge. Pipe sections, typically 40 feet long, are welded to the end of the assembled pipe-line on the barge and the pipe is launched over the stern of the barge as the vessel moves forward.

The part of the pipe between the vessel and the sea bed adopts an S shaped configuration having an upper curve called an overbend and a lower curve called a sagbend. It is important to ensure that there is not excess curvature in the overbend and the sagbend, or else the resulting high stress in the pipe can cause ovalisation, buckling or fracture. Such buckles etc. can be extremely expensive to repair. Typically a supporting structure is employed to support the pipe in the overbend region so as to prevent excess curvature there. Stingers are well known for this purpose and typically employ a buoyant structure for supporting the pipe. However, instead of a buoyant stinger, a fixed and rigid stern ramp is also known for supporting the pipe in the overbend. Such a stern ramp comprises a rigid structure extending from the stern of the pipe laying barge and which remains fixed during pipe laying operations. The ramp is fitted with rollers along its length which are positioned along an arcuate path for supporting pipe launched from the barge as it curves downwardly into the water in the overbend.

Although the overbend of the pipe has to be supported to prevent excess curvature, the sagbend need not be supported. Instead, the curvature in the sagbend can be kept sufficiently low to prevent damage to the pipe by maintaining the pipe under tension, so that the pipe hangs between the barge and the sea bed in a gentle catenary like curve.

Hitherto in normal pipe laying operations, fresh pipe sections are welded to the end of the assembled pipeline on the barge with the barge remaining stationary relative to the sea bed, and similarly the assembled pipe remaining stationary relative to the barge. When a fresh pipe length has been welded on and the joint finished off as required, a length of pipe corresponding to the freshly added on length is launched from the barge by moving the barge forward under the pipe and allowing the pipe to slide off the stern of the barge over the stern ramp or stinger. As mentioned above, if tension is being implied to prevent excess curvature in the sagbend, it is important to ensure that tension is maintained sufficiently high when the pipe is being launched. Hitherto, it has been the practice to allow pipe to move rearwardly off the vessel as the vessel moves forward only when pipe tension exceeds a pre-set upper limit. In this way, tension in the pipe is maintained substantially constant while the pipe is being launched.

For performing pipe laying in this manner, numerous systems and types of machinery have been developed. The barge is typically maintained in station and moved forward when desired by a system of anchors, mooring cables and winches. Tension is maintained in the pipe by machines referred to as "tensioners," which grip the pipe and can operate either to pull pipe in or let pipe out when the measured tension moves outside pre-set limits. Thus, in practice the tensioners can be set to maintain pipe tension substantially constant (within fairly narrow limits), and will pull in the pipe or let out pipe when necessary. Thus, when the laying barge is moved forward, pipe tension would tend to increase. However when the tension reaches the upper limit set for the tensioners, the tensioners will permit pipe to move rearwardly off the lay barge until tension comes back within limits.

SUMMARY OF THE INVENTION

The present invention is a completely new concept in offshore pipe laying techniques and is born of a greater understanding of the theory of pipe behaviour in the suspended region between the laying barge and the sea bed. Thus, the present invention provides a method of laying an off-shore pipe-line using a pipe laying vessel and including repeated steps each of launching a length of pipe from the vessel whilst allowing pipe tension to drop between predetermined safe limits.

By allowing pipe tension to drop during launching of a length of pipe, the launching can be performed without the need for a corresponding forward movement of the vessel, which would have been necessary hitherto in order to maintain pipe tension relatively constant.

Since the vessel does not have to be moved forward during launching, the launching operation can proceed far more quickly than has hitherto been possible. It will be appreciated that moving a pipe laying vessel is a relatively time consuming exercise because of the relatively high bulk and resulting enertia of the vessel. Furthermore, since vessels are normally moved by means of anchors and anchor cables the maximum speed of forward movement is necessarily limited to ensure accurate movement without the need for relatively sudden deceleration.

Of course, since with the method of the present invention pipe tension is permitted to fall, it is important that the predetermined safe limits referred to above are chosen to define a range of pipe tension within which the suspended pipe line is substantially safe from damage. Offshore pipes are being laid in increasingly deeper waters and in such deep water it has been found that there is indeed a significant range of safe tensions for the pipe. The method of the present invention is particularly suited for laying pipe in deep water, i.e. in excess of 250 meters. However, the invention may be suitable for laying pipe in shallower waters depending on the type of pipe being laid. As a general rule for very wide diameter pipes, i.e. 24 inches or more, the invention is restricted to waters with a depth in excess of 250 meters. However for smaller bore pipes, which can undergo greater curvature without damage, the usefulness of the invention extends to shallower depths.

In performing the invention, for each step of launching a length of pipe, the vessel may be moved forward to raise the pipe tension again towards its upper limit at least partly whilst a further length of pipe is being welded to the end of the assembled pipe line on the vessel. As has been explained previously, it is usual to weld fresh length of pipe to the assembled line whilst the assembled line is held substantially fixed relative to the vessel. Thus, no pipe may be launched during welding. It can be appreciated therefore, that the present invention has the great advantage of enabling the time consuming operation of moving the barge forward to be carried out simultaneously with the welding operation when no pipe can be launched.

Furthermore, in the hitherto known pipe laying methods it has proved difficult to prevent short distance adjustments of the position of the assembled pipe relative to the vessel being made by the tensioners during welding time. Especially in deep waters, it is difficult to bring the barge accurately to a halt and hold it stationary during welding time. As a result the movements of the barge during welding time cause increases or decreases in tension in the pipe-line which is compensated for automatically by the tensioners. With the present invention, the pipe may be held fixed relative to the barge for welding while the barge is moved forward bringing the tension back towards its upper limit. Thus, the welding operation can be made easier.

In a further development of the present invention, the pipe laying vessel may be moved forward continuously both during the launching step and during welding.

BRIEF DESCRIPTION OF THE DRAWING

The accompanying drawing is a time lapse diagram illustrating in a simplified manner a pipe launching cycle employing the present invention.

DETAILED DESCRIPTION OF AN EXAMPLE

The drawing shows three views of a pipe launching cycle taken after successive time intervals. In each view a line 10 represents the surface of the sea, a line 11 represents the sea bed and 12 indicates the pipe laying vessel. An assembled pipe-line 13 is shown suspended between the vessel 12 and the sea bed. The pipe-line 13 adopts the usual S shaped configuration and is supported in the overhead by a stinger or fixed stern ramp 14 on the vessel 12.

Referring firstly to the top diagram referenced 1, the vessel 12 is shown after a forward move with the tension in pipe-line 13 at a maximum value. Thus, the pipe-line 13 adopts a relatively flat curve, in its sagbend and touches the sea bed 11 at a point 20. A fresh section of pipe 21 is shown welded to the end 22 of the assembled pipe-line. The fresh section of pipe has a length a.

When the section 21 is welded in place and the joint finished off, a length a of pipe is launched from the vessel 12. During launching of the length a of pipe, the tension in the pipe-line is allowed to drop, so that after launching, the suspended pipe-line adopts a configuration 23 with a more pronounced curvature in the sagbend as shown in diagram 2. Simultaneously, the touch down point moves forward along the sea bed a distance d to a point 24. It has been assumed for the purpose of the illustrated launching cycle that a lower safe tension limit for the suspended pipe span permits the full length a of pipe to be launched without forward movement of the vessel 12.

When the length a of pipe is launched, the vessel 12 is moved forward a similar distance a, thereby increasing tension in the suspended pipe-line. As a result, the curvature in the sagbend is reduced again and after the move forward the pipe has a configuration 26, as shown in diagram 3, which corresponds to that of the pipe 13 before launching.

An important prerequisite of performing the present invention is the determination of safe tension limits for the suspended pipe-line. The upper limit for tension will usually be determined by things other than consideration of pipe safety. Increasing tension tends to reduce curvature in the suspended pipe and accordingly reduce stress. The upper tension limit is probably set, therefore, by considering the maximum available tension that can be applied to the pipe by the tensioners on the pipe laying vessel and also the capabilities of the mooring system of the vessel. However, the maximum tension applied to the pipe should not exceed the tensile strength of the pipe-line. The lower safe tension limit depends on the characteristics of the pipe being laid and also the water depth. In practice the lower safe limit for tension can be determinted theoretically. In one method, a computer is used to simulate a mathematical model of the suspended pipe length and calculate maximum stresses in the pipe. The minimum premissible tension is that at which the pipe stresses would be below the stress limits of the materials of the pipe.

The launching cycle illustrated in the drawing is simplified. In practice, the laying vessel is normally maintained in station by means of mooring cables. In deep water such cables will adopt catenary configurations and, thus, do not positively hold the vessel fixed in position. Accordingly, when pipe tension reduces as pipe is paid out, the vessel will tend to move forward under the influence of the tension in the forward anchor cables which is no longer completely balanced by the reduced pipe tension. Thus, in practice the barge may begin to move forward during the pipe launching period. However the pipe launching may be carried out at the maximum speed of the tensioners so that the full length of a pipe is paid out well before the barge has moved forward a distance a. The barge may continue to move forward after the pipe launching is completed and while the next pipe section is being welded in place.

It is a common practice to weld new pipe sections on to the end of the pipe line by welding simultaneously at a number of welding stations spaced along the length of the barge or vessel. The stations are spaced apart by the lengths of new pipe sections to be welded in place so that any one joint between pipe sections can be worked on at each of the stations in turn. In this way the lengths of the periods during which the pipe must be held stationary relative to the vessel for a welding to take place can be reduced, because only a fraction of the total welding operation on a particular joint is performed at each station. Accordingly, the "welding period" between launching fresh lengths of pipe may be significantly less than the total time required to weld and finish off a joint.

The time saved by this pipe laying procedure is the difference between the time taken to launch length a of pipe at the maximum launching speed and the time that would be taken to move the barge forward a distance a whilst allowing the pipe to move backwards under constant tension. However, in certain circumstances, it may not be possible to complete the launching of length a of pipe at maximum launching speed before pipe tension drops to the lower safe limit. Then the time saving will be reduced as part of the pipe launching process must be slowed down or delayed until the vessel moves forward sufficiently to maintain tension above the lower limit.

In one example, the invention is used to lay pipe in water of a depth of 750 feet. Each section of pipe welded to the assembled pipe-line on the barge is approximately 40 or 80 feet long. Such a length of pipe may be launched whilst allowing the pipe tension to drop between the limits 200 KPS to 125 KPS. The time saving on each launching cycle may be of the order of 25% or more of the total.

In the above described example of the invention it has been suggested that the barge be brought to a halt after moving the distance a and when the next length of pipe is to be launched. However, it is possible to employ the method of the invention with the barge continuously moving along the desired pipe laying track. It is necessary to match the velocity of the barge with the time taken for each pipe launching cycle and the length of each additional pipe section. Thus, for 80 foot lengths of pipe launched every 15 minutes, say, the barge may be moved forward continuously at a speed of 320 feet per hour. It will be appreciated that the forward movement of the barge during the pipe launching process tends only to counteract the tension drop in the pipe to some extent. Thus, during a cyclical pipe laying procedure with the barge moving continuously, the pipe tension will drop relatively quickly when launching pipe and then rise again relatively slowly during the welding time.

I claim:

1. A method of laying an offshore pipe line using a pipe laying vessel and including repeated steps of launching a length of pipe from the vessel at a speed greater than the speed of forward movement of the pipe laying vessel during pipe laying operation while allowing pipe tension to drop between predetermined safe limits, wherein for each step of launching a length of pipe, the vessel is moved forward to raise pipe tension again towards its upper limit at least partly while a further length of pipe is being welded to the end of the assembled pipe line on the vessel.

2. A pipe laying method as claimed in claim 1, wherein the vessel is moved forward during substantially the entirety of a period of welding and the end of the assembled pipe line on the vessel is held fixed relative to the vessel during the welding period.

3. A pipe laying method as claimed in claim 1, wherein the vessel is moved forward continuously during both the repeated launching steps and the welding periods.

4. A pipe laying method as claimed in claim 2, wherein the vessel is moved forward continuously during both the repeated launching steps and the welding periods.

* * * * *